US011648861B2

(12) United States Patent
Kim et al.

(10) Patent No.: US 11,648,861 B2
(45) Date of Patent: May 16, 2023

(54) HEADREST FOR VEHICLE WITH IMPROVED COLLISION PERFORMANCE

(71) Applicants: HYUNDAI MOTOR COMPANY, Seoul (KR); KIA CORPORATION, Seoul (KR)

(72) Inventors: Mu-Young Kim, Osan-si (KR); Sang-Do Park, Suwon-si (KR); Deok-Soo Lim, Hwaseong-si (KR); Ji-Hyun Kim, Uiwang-si (KR); Bong-Ku Kim, Seoul (KR); Ho-Suk Jung, Hwaseong-si (KR); Hyeok-Seung Lee, Seoul (KR); Sang-Hark Lee, Incheon (KR); Hoon-Bok Lee, Hwaseong-si (KR); Jun-Young Yun, Osan-si (KR); Jun-Hwan Lee, Seoul (KR); Chan-Ho Jung, Gunpo-si (KR); Han-Kyeol Cho, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 57 days.

(21) Appl. No.: 17/325,588

(22) Filed: May 20, 2021

(65) Prior Publication Data
US 2022/0194281 A1    Jun. 23, 2022

(30) Foreign Application Priority Data

Dec. 18, 2020   (KR) ........................ 10-2020-0178592

(51) Int. Cl.
*B60N 2/888* (2018.01)
*B60N 2/853* (2018.01)
*B60N 2/879* (2018.01)

(52) U.S. Cl.
CPC ............. *B60N 2/888* (2018.02); *B60N 2/853* (2018.02); *B60N 2/879* (2018.02)

(58) Field of Classification Search
CPC ......... B60N 2/888; B60N 2/879; B60N 2/853
See application file for complete search history.

(56) References Cited

U.S. PATENT DOCUMENTS

| 6,565,150 | B2* | 5/2003 | Fischer | B60N 2/838 |
| | | | | 297/216.12 |
| 7,077,472 | B2* | 7/2006 | Steffens, Jr. | B60N 2/42781 |
| | | | | 297/216.12 |
| 7,134,716 | B2* | 11/2006 | Wieclawski | B60N 2/4228 |
| | | | | 297/216.12 |

(Continued)

FOREIGN PATENT DOCUMENTS

KR    10-2016-0013381 A    2/2016

*Primary Examiner* — Philip F Gabler
(74) *Attorney, Agent, or Firm* — Lempia Summerfield Katz LLC

(57) ABSTRACT

A headrest for a vehicle with improved collision performance includes: a headrest stay provided integrally with a seat back and exposed at an upper end of the seat back; a blower connected to the headrest stay; and a rotation direction change member installed between the headrest stay and the blower, connecting the headrest stay and the blower, and configured to allow a rotation direction of the headrest stay and a rotation direction of the blower to be opposite to each other in an event of a rear collision.

18 Claims, 14 Drawing Sheets

(56) References Cited

U.S. PATENT DOCUMENTS

| | | | | |
|---|---|---|---|---|
| 7,185,950 B2* | 3/2007 | Pettersson | ............... | B60N 2/888 |
| | | | | 297/216.12 |
| 8,052,211 B2* | 11/2011 | Nilakantan | ............ | B60N 2/888 |
| | | | | 297/216.12 |
| 8,100,473 B2* | 1/2012 | Tarusawa | ................ | B60N 2/888 |
| | | | | 297/216.12 |
| 8,201,881 B2* | 6/2012 | Otsuka | ............... | B60N 2/42781 |
| | | | | 297/216.12 |
| 8,414,078 B2* | 4/2013 | Fujita | ........................ | B60N 2/85 |
| | | | | 297/391 |
| 9,102,256 B2* | 8/2015 | Tachikawa | ............ | B60N 2/5841 |
| 2001/0004167 A1* | 6/2001 | Takeda | .................... | B60N 2/847 |
| | | | | 297/408 |
| 2005/0035642 A1* | 2/2005 | Hake | ....................... | B60N 2/815 |
| | | | | 297/396 |

* cited by examiner

HEADREST FOR VEHICLE WITH IMPROVED COLLISION PERFORMANCE

CROSS-REFERENCE TO RELATED APPLICATION

This application claims priority to and the benefit of Korean Patent Application No. 10-2020-0178592, filed on Dec. 18, 2020, the entire contents of which are incorporated herein by reference.

FIELD

The present disclosure relates to a headrest mounted on a seat for a vehicle.

BACKGROUND

The statements in this section merely provide background information related to the present disclosure and may not constitute prior art.

A seat for a vehicle includes a seat track configured to support an occupant's lower body, a seat back installed to be connected to the seat track and configured to support the occupant's upper body, and a headrest installed at an upper end of the seat back and configured to protect the occupant's head.

The headrest serves to support the occupant's head at normal times.

In particular, the headrest inhibits injury to the occupant's cervical vertebrae caused by the occupant's neck bent back in the event of a rear collision. To this end, according to the regulations about a rear collision, the headrest needs to come into contact with the occupant's head and support the occupant's head within a predetermined period of time in the event of a rear collision.

However, because the seat back on which the headrest is installed is tilted toward a rear side of the vehicle by inertia in the event of a rear collision, the headrest becomes further distant from the occupant, which further increases the time it takes for the headrest to come into contact with the occupant's head.

A tilt mechanism may be applied to the headrest, but the tilt mechanism has a complicated structure and inevitably increases the number of components and a weight of the headrest.

SUMMARY

The present disclosure provides a headrest for a vehicle with improved collision performance, the headrest being configured to move forward in the event of a rear collision of a vehicle, thereby shortening the time it takes for the headrest to begin to support an occupant's head.

A headrest for a vehicle with improved collision performance according to one form of the present disclosure includes: a headrest stay provided integrally with a seat back and exposed at an upper end of the seat back; a blower connected to the headrest stay; and a rotation direction change member installed between the headrest stay and the blower, and configured to allow a rotation direction of the headrest stay and a rotation direction of the blower to be opposite to each other in the event of a rear collision.

The blower may include therein a fixing bracket fastened, at one side thereof, to an inner surface of the blower.

The rotation direction change member may be a rotary link hingedly connected, at a lower end thereof, to the headrest stay and hingedly connected, at an upper end thereof, to the fixing bracket.

The headrest stay, which penetrates the lower end of the rotary link, and a hinge pin, which penetrates the upper end of the rotary link and the fixing bracket, may be parallel to each other.

The hinge pin may be positioned forward from an upper end of the headrest stay based on the vehicle.

The rotation direction change member may be a rotary link hingedly connected, at an upper end thereof, to an upper end of the headrest stay and hingedly connected, at a lower end thereof, to the fixing bracket.

The lower end of the rotary link may be positioned forward from the upper end of the rotary link based on a vehicle.

A hinge pin, which penetrates the fixing bracket and the lower end of the rotary link, and the headrest stay, which penetrates the upper end of the rotary link, may be provided in a width direction of a vehicle and be parallel to each other.

The blower may have a guide hole penetrated by the headrest stay.

The guide hole may be formed in a long-hole shape formed in a longitudinal direction of the vehicle and may be configured to restrict an angle at which the headrest is tilted forward in the event of a rear collision for protecting an occupant's head.

The headrest stay may be in contact with a rear end of the guide hole at normal times, such that a predetermined position of the blower is maintained with respect to the headrest stay.

The headrest may include a pad made of a cushioning material and configured to surround the blower.

At normal times, one side of the pad may be in contact with the upper end of the seat back or spaced apart from the upper end of the seat back at a predetermined interval to restrict a rotation of the headrest.

When the headrest stay is rotated rearward by inertia in the event of a rear collision, the headrest and the blower may be rotated forward by inertia oppositely to the headrest stay.

A headrest for a vehicle with improved collision performance according to another form of the present disclosure is installed at an upper end of a seat back and configured to protect an occupant's head in the event of a rear collision, and the headrest includes: a headrest stay provided integrally with the seat back and exposed at the upper end of the seat back; a blower; a rotary link provided between the blower and the headrest, connecting the blower and the headrest; and configured to allow a rotation direction of the blower to be opposite to a rotation direction of the headrest stay; and a pad made of a cushioning material and configured to surround the blower, wherein when the upper end of the seat back rotates toward a rear side of the vehicle in the event of the rear collision, the blower rotates and tilts.

The blower may include therein a fixing bracket attached, at one side thereof, to an inner surface of the blower and hingedly connected, at the other side thereof, to the rotary link.

A hinge pin, which hingedly connects the rotary link and the fixing bracket, may be positioned forward from the upper end of the headrest stay, which penetrates the rotary link, based on the vehicle.

The headrest stay may penetrate the blower such that the upper end of the headrest stay is positioned in the blower, and the blower may have a guide hole penetrated by the headrest stay, formed in a long-hole shape, and configured to restrict a rotation angle of the blower in the event of a rear collision.

According to the headrest for a vehicle with improved collision performance according to the present disclosure configured as described above, the headrest moves forward in the event of a rear collision even though the seat back is tilted toward a rear side of the vehicle. As a result, it is possible to shorten the time it takes for the headrest to come into contact with the occupant's head.

Since the time it takes for the headrest to come into contact with the occupant's head is shortened as described above, the headrest may quickly support the occupant's head in the event of a rear collision, thereby reducing injury to the occupant.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
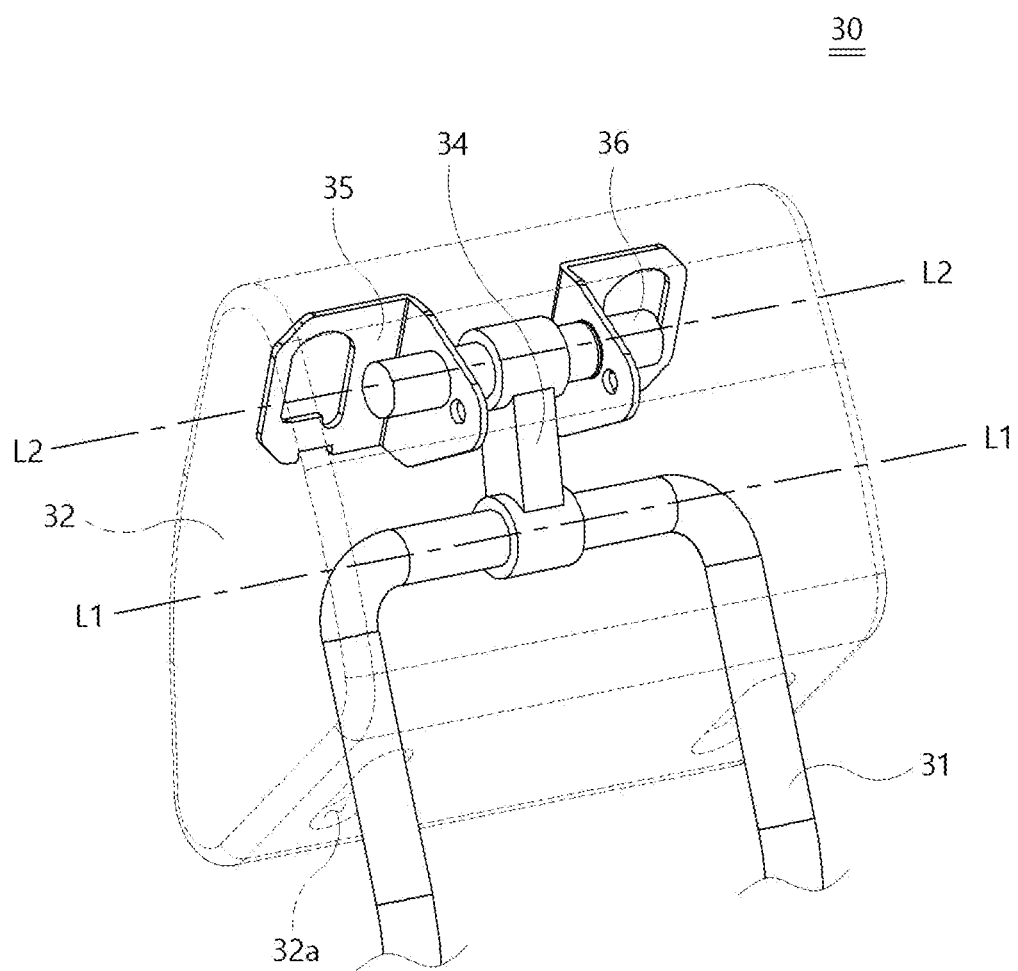
FIG. 1 is a perspective view illustrating a headrest for a vehicle with improved collision performance according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a headrest for a vehicle with improved collision performance according to the present disclosure will be described in detail with reference to the accompanying drawings.

A headrest 30 for a vehicle with improved collision performance according to the present disclosure is installed at an upper end of a seat back 20 to protect an occupant's head in the event of a rear collision, and the headrest 30 includes a headrest stay 31 provided integrally with the seat back 20 and exposed at the upper end of the seat back 20, and a blower 32 connected to the headrest stay 31. A rotation direction change member is provided between the headrest stay 31 and the blower 32 and allows a rotation direction of the headrest stay 31 and a rotation direction of the blower 32 to be opposite to each other in the event of a rear collision.

A seat for a vehicle includes a seat track 10 installed on a seat rail installed on a floor panel and configured to support the occupant's lower body, a seat back 20 hingedly connected, at a lower end thereof, to the seat track 10 and configured to support the occupant's upper body, and the headrest 30 installed at the upper end of the seat back 20.

In the present disclosure, when the seat back 20 is rotated rearward by inertia in the event of a rear collision, the headrest 30 is rotated in a direction opposite to the direction of the seat back 20.

To this end, the rotation direction change member is provided to change the rotation direction of the headrest 30 and the rotation direction of the seat back 20 by inertia so that the rotation direction of the headrest 30 and the rotation direction of the seat back 20 are opposite to each other in the event of a rear collision. The headrest 30 is not connected directly to the headrest stay 31 installed on the seat back 20, but connected to the headrest stay 31 through the rotation direction change member.

That is, the blower 32 of the headrest 30 is not connected directly to the headrest stay 31. The rotation direction change member is interposed between the blower 32 and the headrest stay 31 to connect the blower 32 and the headrest stay 31.

The blower 32 refers to a component that defines a structure of the headrest 30. A space is provided in the blower 32, and the headrest 30 is connected to the headrest stay 31 in the blower 32.

A pad 33 is provided on an outer portion of the blower 32, made of a cushioning material, and configured to come into direct contact with the occupants head. The pad 33 serves to surround the outer portion of the blower 32, inhibit the occupant's head from coming into direct contact with the blower 32 made as a rigid body and absorb impact when the blower 32 comes into contact with the occupant's head.

The headrest stay 31 protrudes toward the upper end of the seat back 20 and is provided integrally with the seat back 20. An upper end of the headrest stay 31 is formed in a width direction of the vehicle and serves as a rotation axis. The headrest stay 31 is installed on the seat back 20 to be movable upward and downward, and a height of the headrest stay 31 is adjusted in accordance with the occupant's height.

The upper end of the headrest stay 31 is positioned in the blower 32. Guide holes 32a each having a long-hole shape are formed in a longitudinal direction of the vehicle at portions of the blower 32 through which the headrest stay 31 passes. The guide holes 32a restrict a rotation angle of the blower 32 with respect to the headrest stay 31, that is, an angle at which the blower 32 is tilted in the event of a rear collision. The headrest stay 31 is in contact with rear ends of the guide holes 32a at normal times, such that the blower 32 remains at a predetermined position with respect to the headrest stay 31. The headrest stay 31 comes into contact with front ends of the guide holes 32a in the event of a rear collision to restrict the angle at which the blower 32 is tilted.

The blower 32 is not connected directly to the headrest stay 31 but connected to the headrest stay 31 through the rotation direction change member.

In this case, the rotation direction change member may be a rotary link 34 hingedly connected, at a lower end thereof, to the upper end of the headrest stay 31 and hingedly connected, at an upper end thereof, to the blower 32.

The rotary link 34 is installed such that the lower end thereof penetrates the upper end of the headrest stay 31, and as a result, the rotary link 34 and the headrest stay 31 are hingedly connected. Therefore, the rotary link 34 may rotate about a line L1-L1, illustrated in FIG. 1, with respect to the headrest stay 31.

The upper end of the rotary link 34 is hingedly connected to one side in the blower 32. To this end, fixing brackets 35 are fixed into the blower 32 and hingedly connected to the upper end of the rotary link 34. A hinge pin 36 is installed to penetrate the fixing brackets 35 and the upper end of the rotary link 34. The fixing brackets 35 may rotate about the hinge pin 36, such that the blower 32 may rotate about a line L2-L2 illustrated in FIG. 1.

The rotation axes of the upper and lower ends of the rotary link 34, that is, the line L1-L1 and the line L2-L2 are parallel to each other and provided in the width direction of the vehicle.

Figure 2:
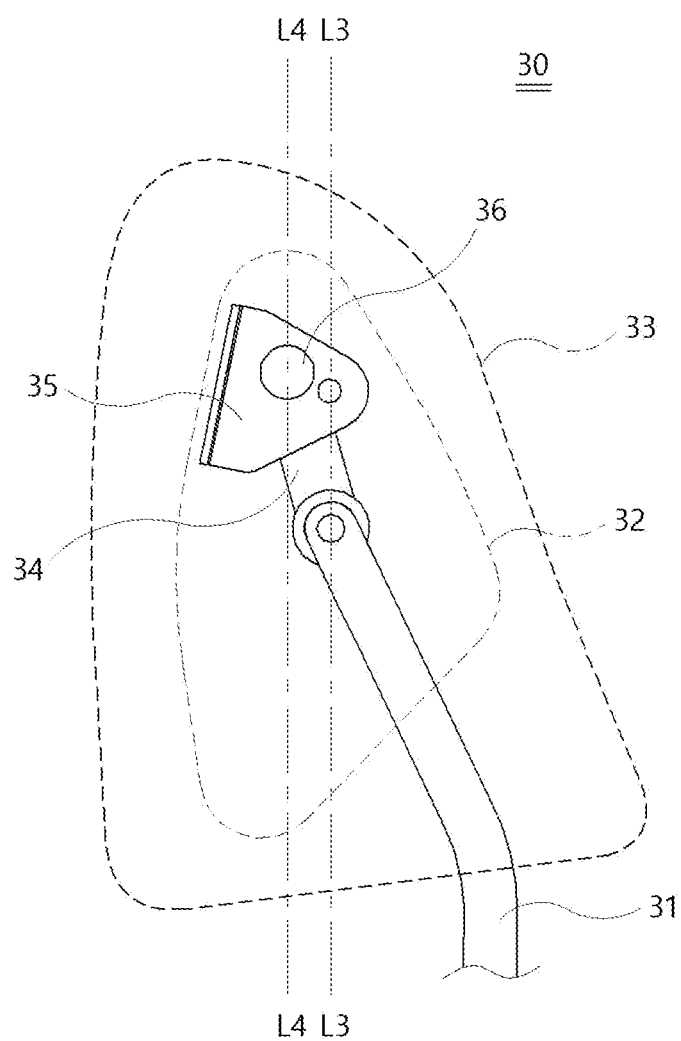
FIG. 2 is a side view illustrating the headrest for a vehicle with improved collision performance according to one form of the present disclosure.

In addition, a portion of the rotary link 34, which is hingedly connected to the blower 32, is positioned forward from a portion of the rotary link 34, which is hingedly connected to the headrest stay 31. That is, as illustrated in FIG. 2, a line L4-L4 is positioned forward from a line L3-L3, such that the hinge pin 36 is positioned forward from the upper end of the headrest stay 31 based on the vehicle. Likewise, the upper end of the rotary link 34 is positioned forward from the lower end of the rotary link 34 based on the vehicle.

At normal times, the pad 33 is in contact with the upper end of the seat back 20 or spaced apart from the upper end of the seat back 20 at a predetermined distance, such that a predetermined angle of the headrest 30 is maintained with respect to the headrest stay 31 at normal times. In this case, the headrest 30 is configured such that the hinge pin 36 by which the rotary link 34 is hingedly connected to the fixing bracket 35 is positioned forward from the upper end of the headrest stay 31 to which the rotary link 34 is hingedly connected.

However, in the event of a rear collision, the pad 33 is pressed and deformed, such that the blower 32 may rotate. In addition, when the headrest stay 31 is rotated rearward by inertia in the event of a rear collision, the headrest 30 and the blower 32 are rotated forward by inertia oppositely to the headrest stay 31.

An operation of the headrest for a vehicle with improved collision performance according to the present disclosure will be described below.

Figure 3:
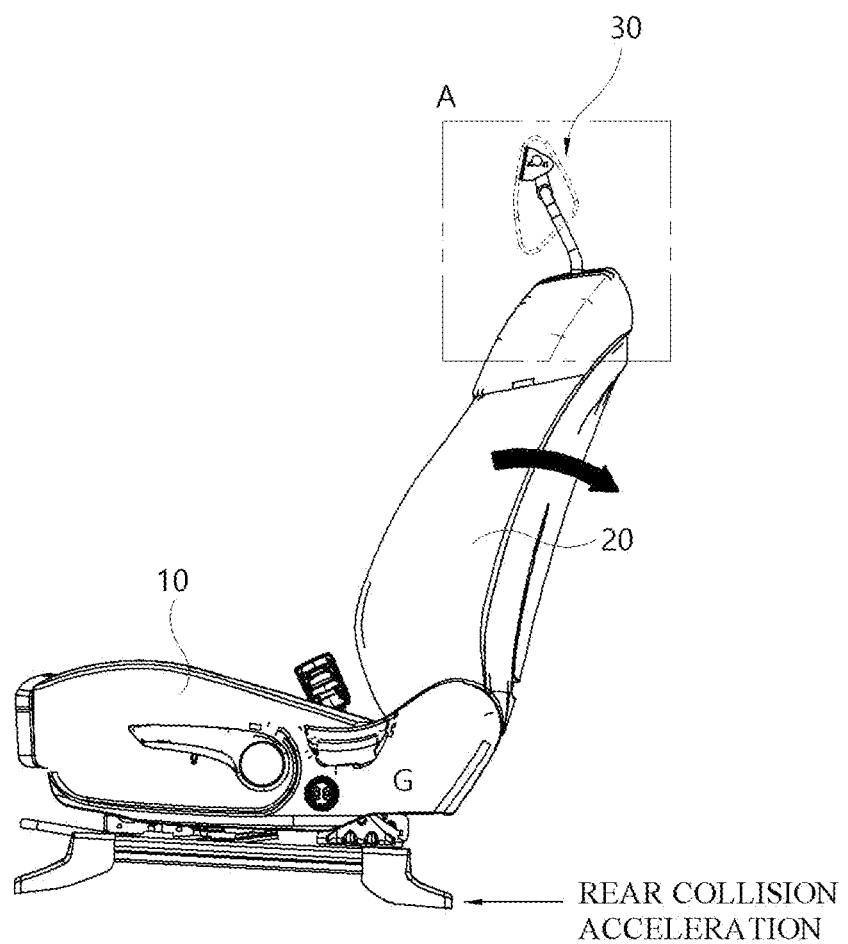
FIG. 3 is a side view illustrating a seat on which the headrest for a vehicle with improved collision performance according to one form of the present disclosure is mounted.

As illustrated in FIG. 3, in the event of a rear collision, acceleration made by the rear collision is applied to the seat, and force, which rotates and tilts the seat back 20 rearward, is generated by inertia (see the arrow in FIG. 3).

Figure 4A:
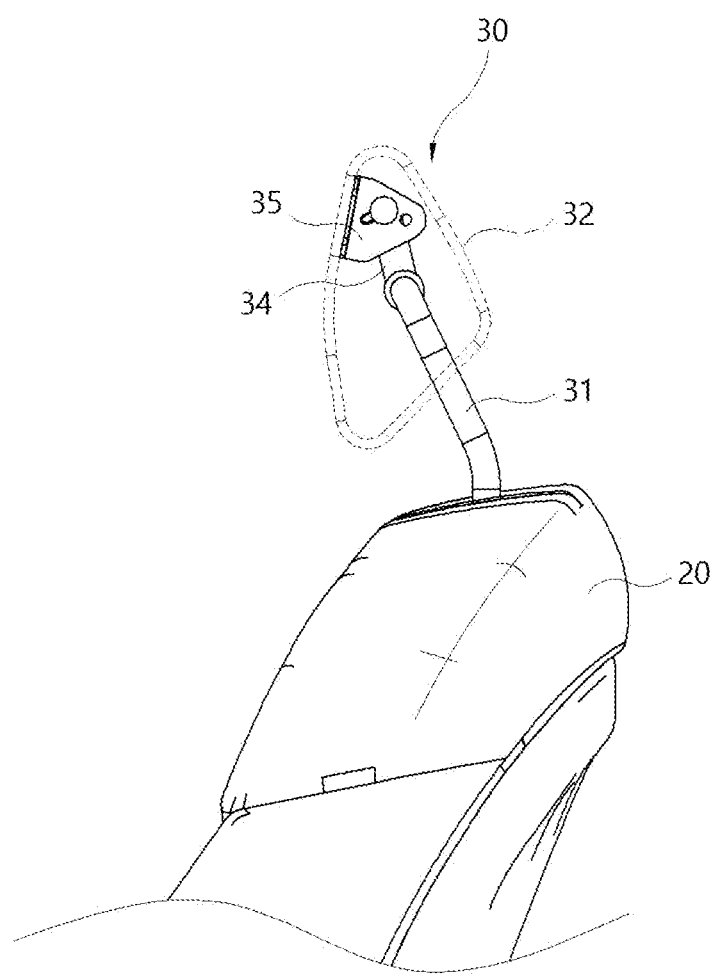
FIG. 4A is a perspective view illustrating the state of the headrest for a vehicle with improved collision performance according to one form of the present disclosure before a rear collision.
Figure 4B:
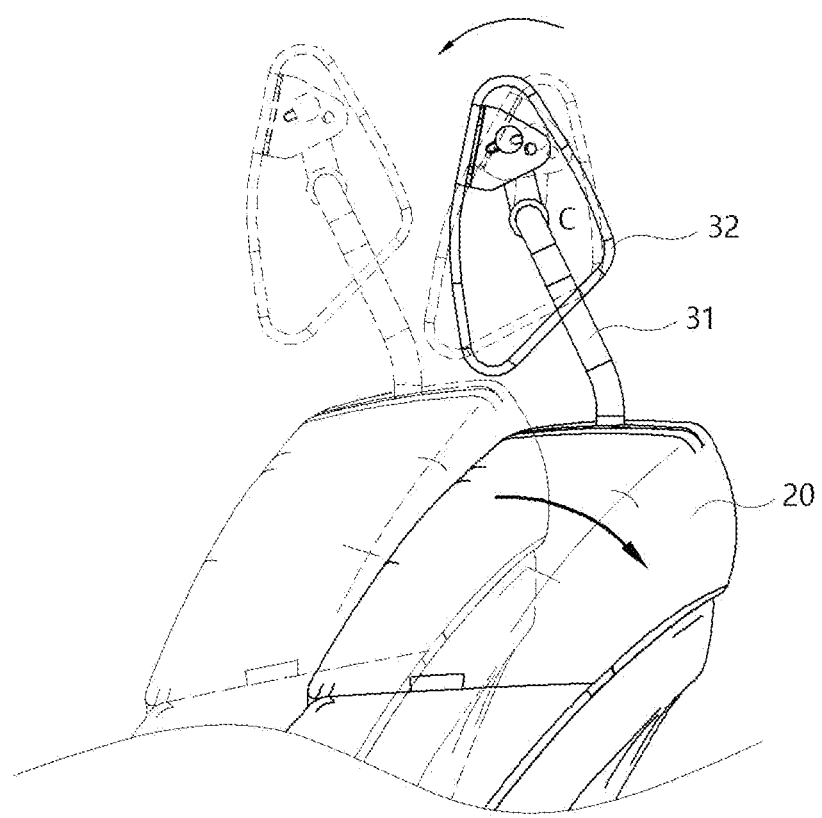
FIG. 4B is a perspective view illustrating the state of the headrest for a vehicle with improved collision performance according to one form of the present disclosure in the event of a rear collision.
Figure 5A:
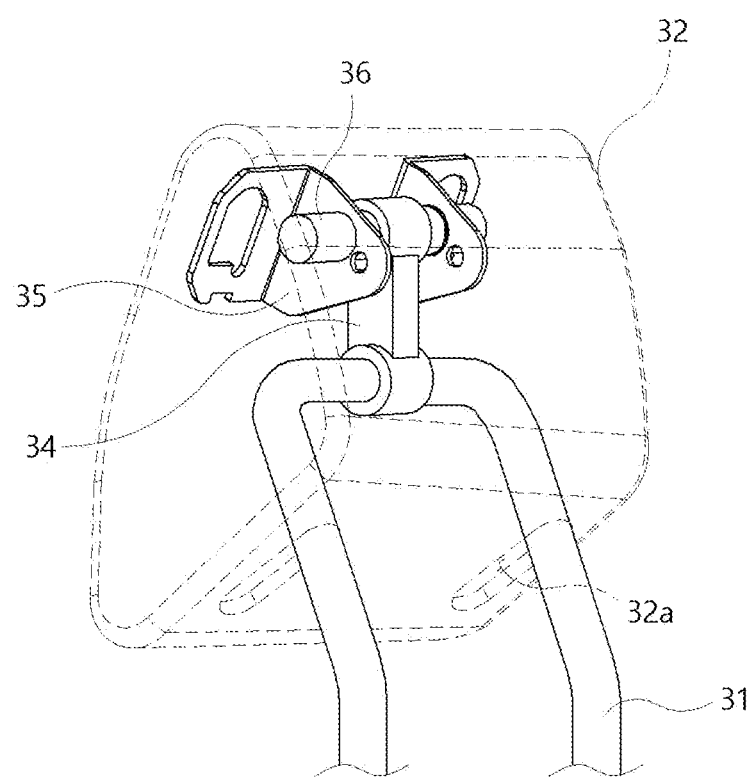
FIGS. 5A and 5B are a perspective view and a side view illustrating the states of the headrest for a vehicle with improved collision performance according to one form of the present disclosure before a rear collision.
Figure 5B:
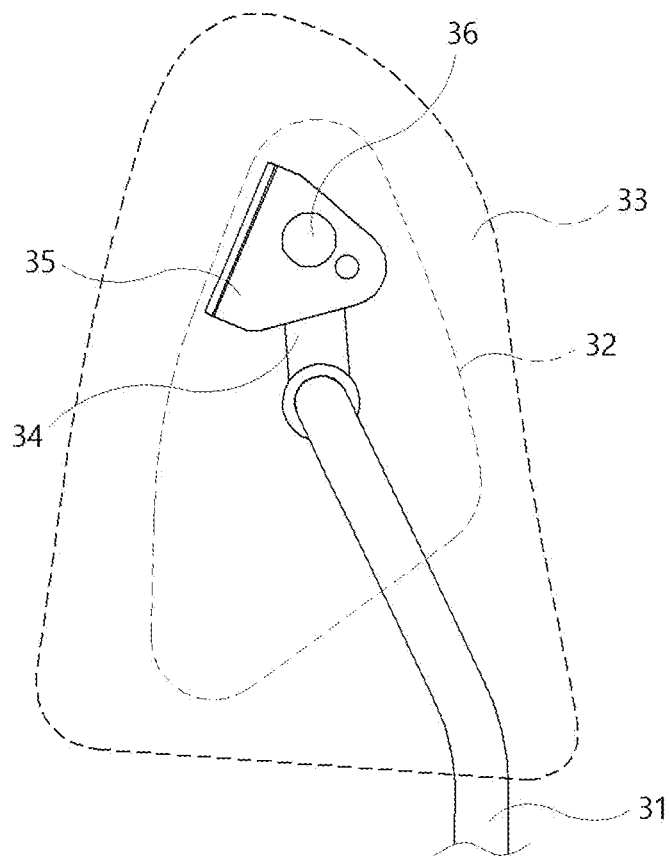
Figure 6A:
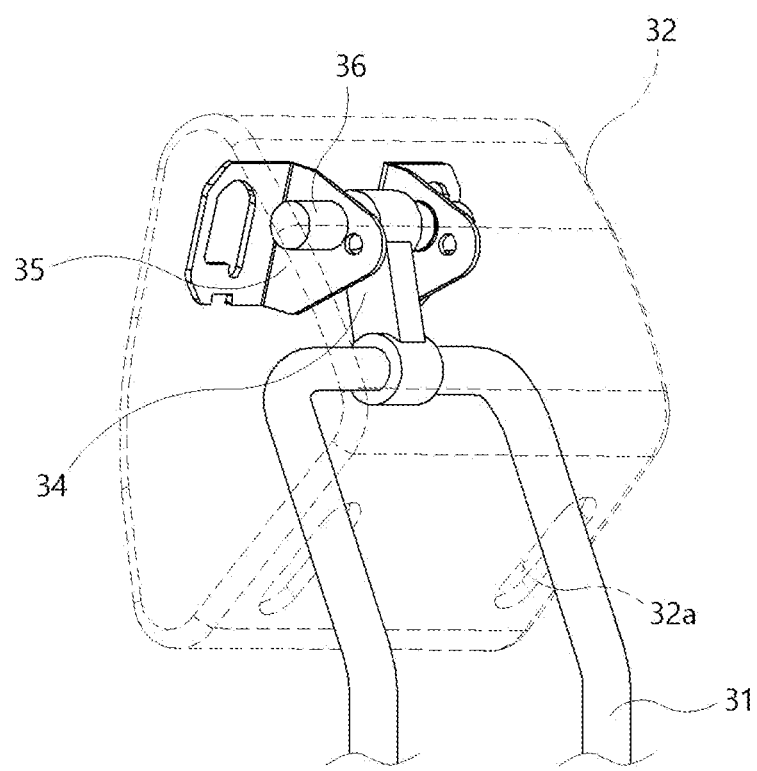
FIGS. 6A and 6B are a perspective view and a side view illustrating the initial states of the headrest for a vehicle with improved collision performance according one form of to the present disclosure in the event of a rear collision.
Figure 6B:
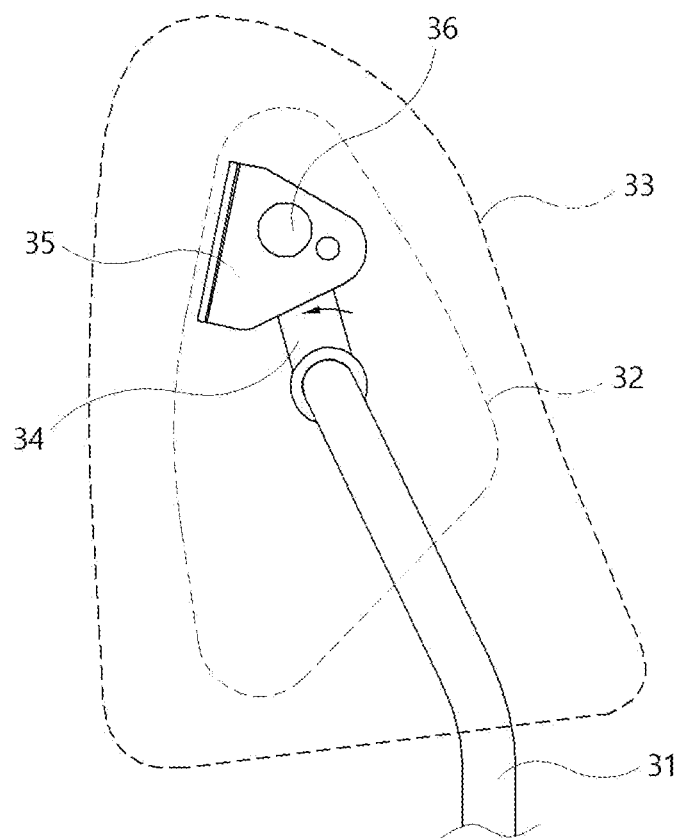
Figure 7A:
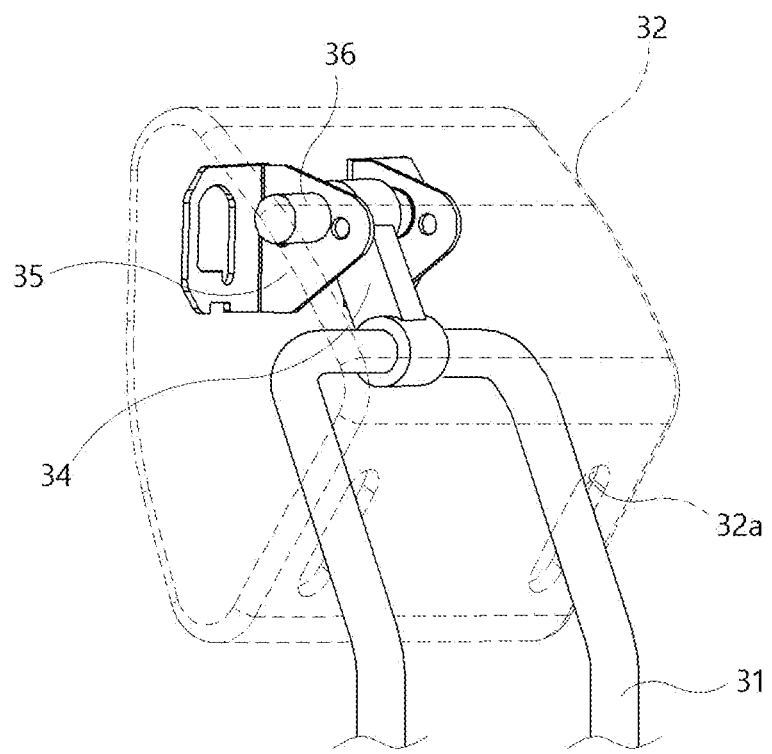
FIGS. 7A and 7B are a perspective view and a side view illustrating the intermediate states of the headrest for a vehicle with improved collision performance according one form of to the present disclosure in the event of a rear collision.
Figure 7B:
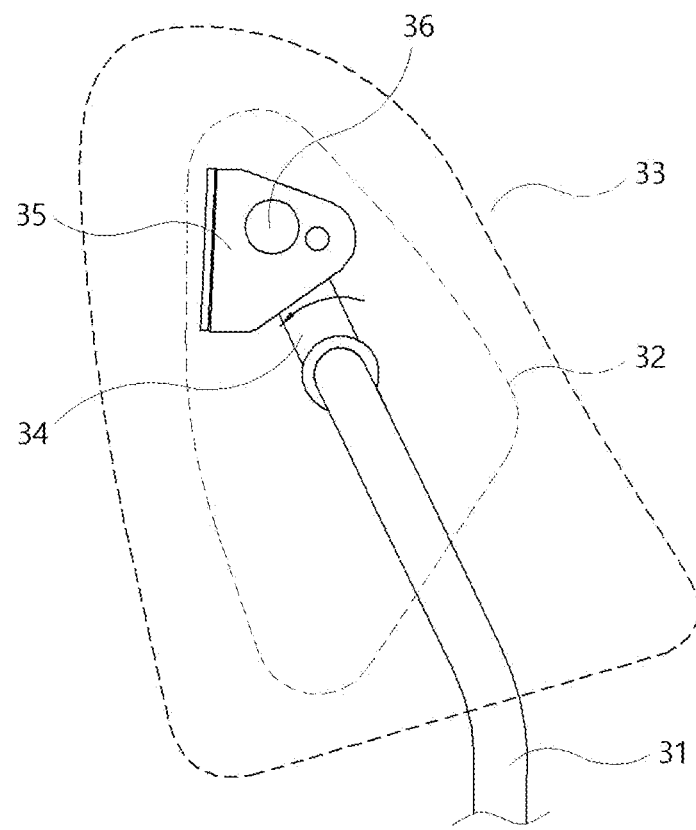

In this case, the rotary link 34 rotates in the opposite direction, and the blower 32 in the part, which is indicated by A in FIG. 3, rotates in the direction opposite to the rotation direction of the seat back 20, as illustrated in FIG. 4B, such that the blower 32 is tilted forward, thereby more quickly supporting the occupant's head.

This process will be described below in detail with reference to FIGS. 5A to 8B. FIGS. 5A to 8B illustrate states in which the rotary link 34 and the blower 32 rotate with respect to the headrest stay 31.

At normal times (see FIGS. 5A and 5B), the headrest stay 31 is in contact with the front ends of the guide hole 32a, and an initial angle of the blower 32 is maintained with respect to the headrest stay 31. Therefore, an initial state of the headrest 30 is maintained with respect to the seat back 20.

At the initial time of a rear collision (see FIGS. 6A and 6B), when the seat back 20 is rotated rearward by inertia, the headrest stay 31 also moves rearward, such that inertia is applied to the rotary link 34 and the blower 32 so that the rotary link 34 and the blower 32 are rotated in the opposite direction, that is, tilted forward. Therefore, the blower 32 begins to rotate in the direction in which the blower 32 is tilted forward (see FIG. 6B), and the headrest stay 31 also moves away from the ends of the guide holes 32a, such that the headrest 30 rotates and tilts forward.

Thereafter, as the rear collision continues (see FIGS. 7A and 7B), the rotary link 34 and the blower 32 further rotate and tilt forward.

Figure 8A:
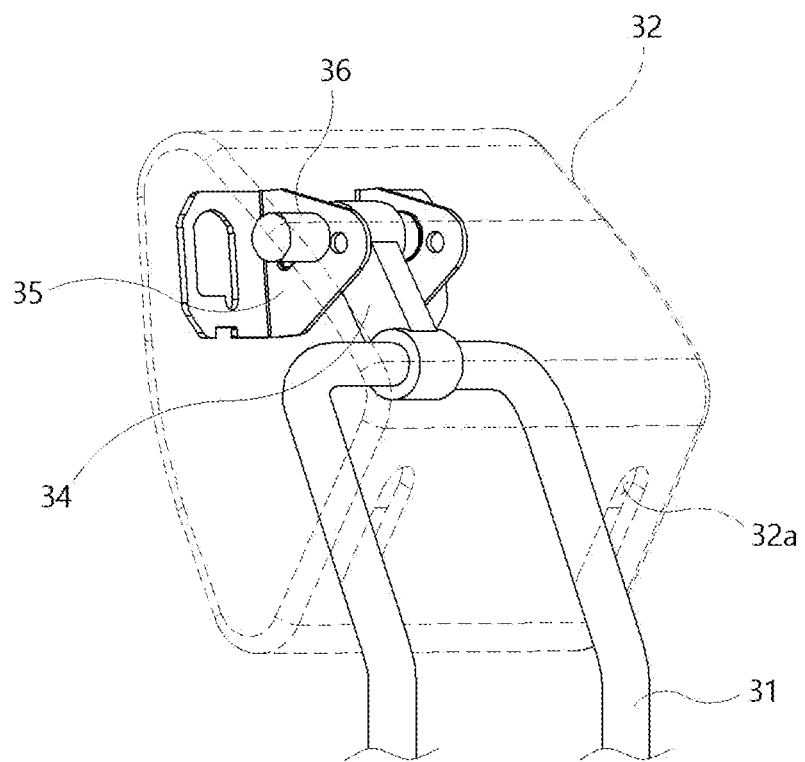
FIGS. 8A and 8B are a perspective view and a side view illustrating the final states of the headrest for a vehicle with improved collision performance according to one form of the present disclosure in the event of a rear collision.
Figure 8B:
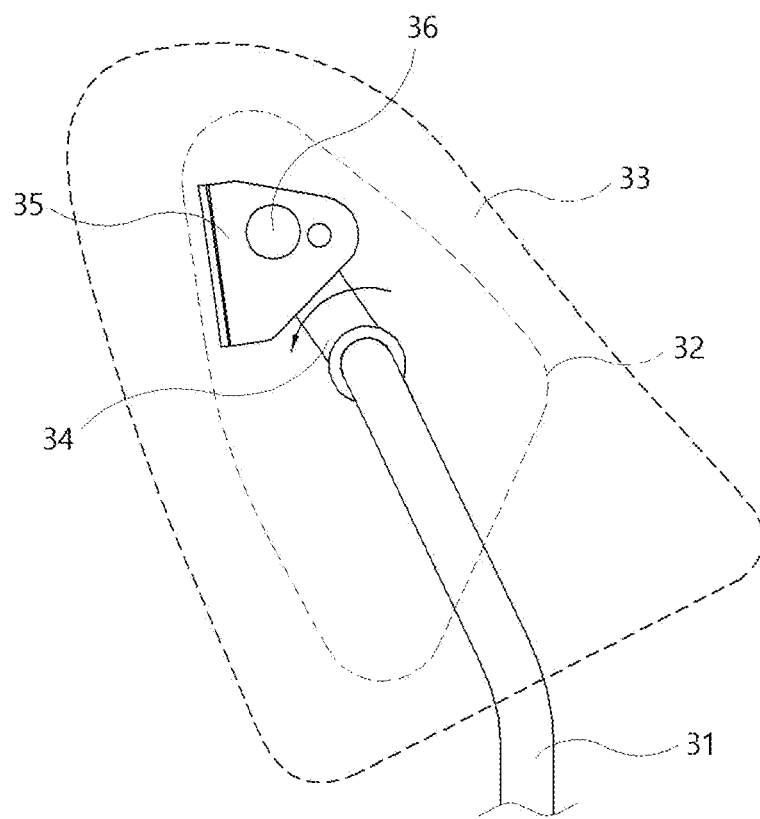

Meanwhile, when the blower 32 further rotates and the headrest stay 31 comes into contact with the ends of the guide holes 32a which are opposite to the front ends of the guide holes 32a, the rotary link 34 and the blower 32 are tilted maximally, such that the headrest 30 is also tilted maximally (see FIGS. 8A and 8B).

In this state, the headrest 30 may come into contact with the occupant's head and thus more quickly support the occupant's head, thereby reducing injury to the occupant. Furthermore, the headrest 30 may meet the regulations about collisions.

Figure 9:
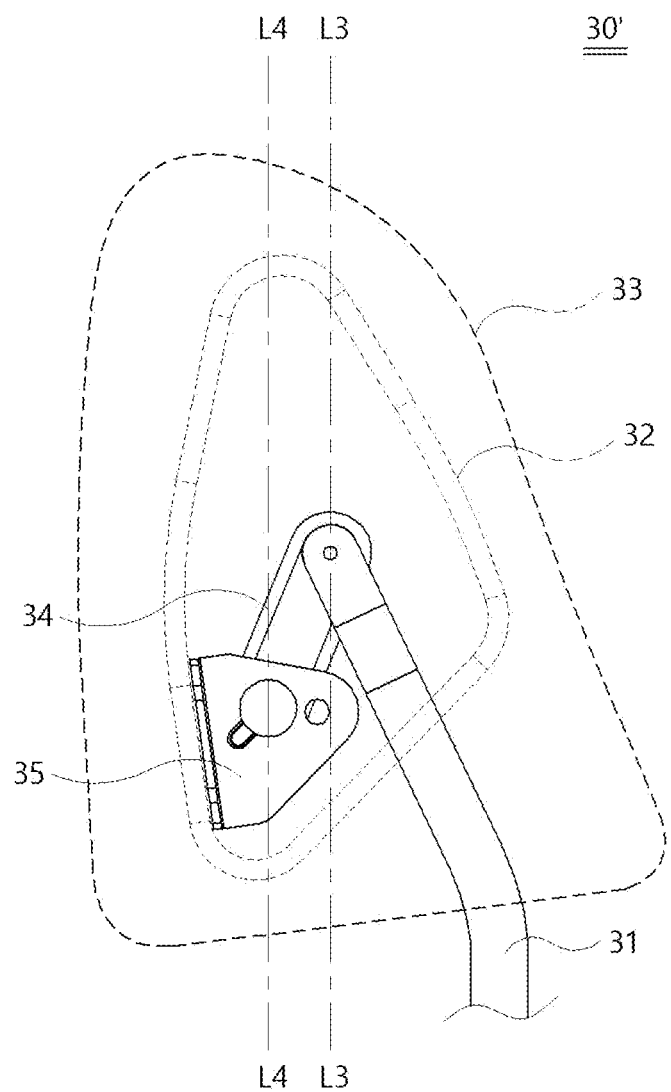
FIG. 9 is a side view illustrating a headrest for a vehicle with improved collision performance according to another form of the present disclosure.

FIG. 9 illustrates a headrest for a vehicle with improved collision performance according to another form of the present disclosure.

In the present form, like the above-mentioned form, the blower 32 of the headrest 30 is not connected directly to the headrest stay 31, and the rotation direction change member, that is, the rotary link 34, which rotates the blower 32 in the direction opposite to the rotation direction of the headrest stay 31 in the event of a rear collision, is provided between the blower 32 and the headrest stay 31.

However, in the present form, the lower end of the rotary link 34 is hingedly connected to the fixing brackets 35 fastened to the blower 32, and the upper end of the rotary link 34 is hingedly connected to the upper end of the headrest stay 31.

In addition, even in the present form, the portion of the rotary link 34, which is connected to the blower 32, is positioned forward from the portion of the rotary link 34, which is hingedly connected to the headrest stay 31. That is, the line L4-L4 is positioned forward from the line L3-L3.

Even in the present form, in the event of a rear collision, when the seat back 20 and the headrest 30 are rotated rearward by inertia, the inertia applied to the blower 32 rotates and tilts the blower 32 forward.

Therefore, it is possible to shorten the time it takes for the occupant's head to come into contact with the headrest 30.

What is claimed is:

1. A headrest for a vehicle with improved collision performance, the headrest comprising:
    a headrest stay provided integrally with a seat back and exposed at an upper end of the seat back;
    a blower; and
    a rotation direction change member installed between the headrest stay and the blower, and configured to:
    connect the blower and the headrest stay, and
    allow a rotation direction of the headrest stay and a rotation direction of the blower to be opposite to each other when a rear collision occurs.

2. The headrest of claim 1, wherein the blower includes a fixing bracket fastened to an inner surface of the blower.

3. The headrest of claim 2, wherein the rotation direction change member is a rotary link, and includes a lower end hingedly connected to the headrest stay and an upper end hingedly connected to the fixing bracket.

4. The headrest of claim 3, further comprising a hinge pin configured to penetrate the upper end of the rotary link and the fixing bracket,
    wherein the headrest stay configured to penetrate the lower end of the rotary link is parallel to the hinge pin.

5. The headrest of claim 4, wherein the hinge pin is positioned forward from an upper end of the headrest stay based on the vehicle.

6. The headrest of claim 2, wherein the rotation direction change member is a rotary link, and includes an upper end hingedly connected to an upper end of the headrest stay and a lower end hingedly connected to the fixing bracket.

7. The headrest of claim 6, wherein the lower end of the rotary link is positioned forward from the upper end of the rotary link based on the vehicle.

8. The headrest of claim 6, further comprising a hinge pin configured to penetrate the fixing bracket and the lower end of the rotary link,
    wherein the headrest stay penetrating the upper end of the rotary link and the hinge pin are provided in a width direction of the vehicle and are parallel to each other.

9. The headrest of claim 1, wherein the blower includes a guide hole configured to be penetrated by the headrest stay.

10. The headrest of claim 9, wherein the guide hole is formed in an elongated shape extending in a longitudinal direction of the vehicle and is configured to restricts an angle at which the headrest is tilted forward when the rear collision occurs.

11. The headrest of claim 10, wherein absent an event of the rear collision, the headrest stay is configured to be in contact with a rear end of the guide hole, and the blower is configured to be maintained at a predetermined position with respect to the headrest stay.

12. The headrest of claim 10, comprising a pad made of a cushioning material and configured to surround the blower.

13. The headrest of claim 12, wherein in absence of the rear collision, one side of the pad is in contact with the upper end of the seat back or is spaced apart from the upper end of the seat back at a predetermined interval.

14. The headrest of claim 12, wherein when the rear collision occurs, the headrest stay is rotated rearward by inertia caused by the rear collision while the headrest and the blower are rotated forward by inertia applied oppositely to the headrest stay.

15. A headrest for a vehicle with improved collision performance, where the headrest is installed at an upper end of a seat back and protects a head of an occupant in an event of a rear collision, the headrest comprising:
    a headrest stay provided integrally with the seat back and exposed at the upper end of the seat back;
    a blower;
    a rotary link provided between the headrest stay and the blower, and configured to:
    connect the headrest stay and the blower, and
    allow a rotation direction of the blower to be opposite to a rotation direction of the headrest stay; and
    a pad made of a cushioning material and configured to surround the blower,
    wherein when the upper end of the seat back rotates toward a rear side of the vehicle when a rear collision occurs, the blower is configured to rotate and tilt.

16. The headrest of claim 15, wherein the blower includes a fixing bracket including a first side attached to an inner surface of the blower and a second end hingedly connected to the rotary link.

17. The headrest of claim 16, further comprising a hinge pin configured to hingedly connect the rotary link and the fixing bracket, and positioned forward from an upper end of the headrest stay, which penetrates the rotary link, based on the vehicle.

18. The headrest of claim 15, wherein the headrest stay is configured to penetrate the blower such that the upper end of the headrest stay is positioned in the blower, and
    the blower includes a guide hole formed in an elongated shape extending in a longitudinal direction, and configured be penetrated by the headrest stay and to restrict a rotation angle of the blower when the rear collision occurs.

* * * * *